United States Patent
Lee et al.

(10) Patent No.: US 7,778,730 B2
(45) Date of Patent: Aug. 17, 2010

(54) ROBOT FOR GENERATING MULTIPLE EMOTIONS AND METHOD OF GENERATING MULTIPLE EMOTIONS IN ROBOT

(75) Inventors: Seung Ik Lee, Daejeon (KR); Gun Yong Park, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 958 days.

(21) Appl. No.: 11/592,100

(22) Filed: Nov. 2, 2006

(65) Prior Publication Data

US 2007/0150099 A1 Jun. 28, 2007

(30) Foreign Application Priority Data

Dec. 9, 2005 (KR) .............. 10-2005-0121007
May 1, 2006 (KR) .............. 10-2006-0039282

(51) Int. Cl.
G06F 19/00 (2006.01)
(52) U.S. Cl. ............................................. 700/245
(58) Field of Classification Search ............... 700/245, 700/258–259; 901/1, 46–47
See application file for complete search history.

(56) References Cited

U.S. PATENT DOCUMENTS

2006/0184273 A1* 8/2006 Sawada et al. ............ 700/245

FOREIGN PATENT DOCUMENTS

| JP | 2001-157980 | 6/2001 |
|---|---|---|
| JP | 2001-212783 | 8/2001 |
| JP | 2002-233977 | 8/2002 |
| KR | 1020010031909 | 4/2001 |
| KR | 1020020026165 | 4/2002 |
| KR | 1020050028171 | 3/2005 |
| WO | WO00/32361 | 8/2000 |

OTHER PUBLICATIONS

Park, Gun-Yong et al., "Emotion Coordination Model for Autonomous Robot," The 2nd International conference on Ubiquitous Robots and Ambient Intelligence, 2005.
Arkin, Ronald C. et al., "An Ethological and Emotional Basis for Human-Robot Interaction.".
KIPO Notice of Patent Grant dated Mar. 26, 2008 for the corresponding application KR 10-2006-0039282.

* cited by examiner

*Primary Examiner*—Kim T Nguyen
(74) *Attorney, Agent, or Firm*—Ladas & Parry LLP (57) ABSTRACT

A robot for generating multiple emotions is provided. The robot includes a sensor unit sensing external environment information, a database unit storing a predetermined list including information on types of behavior the robot is allowed, a user's reaction corresponding to each behavior of the robot, and favorite objects of the robot, a primary emotion generation unit generating an emotion corresponding to characteristics of the sensed information when the sensed information exceeds a predetermined threshold value, and a secondary emotion generation unit generating an emotion corresponding to characteristics of the sensed information based on the information sensed by the sensor unit, the list stored in the database unit, the amount of internal power of the robot, internal information on the robot indicating the existence of an operational error and an elapse of time.

12 Claims, 7 Drawing Sheets

(a) NORMAL MODE (b) POSITIVE MOOD (c) NEGATIVE MOOD

ROBOT FOR GENERATING MULTIPLE EMOTIONS AND METHOD OF GENERATING MULTIPLE EMOTIONS IN ROBOT

CROSS-REFERENCE TO RELATED PATENT APPLICATION

This application claims the benefit of Korean Patent Application No. 10-2005-0121007, filed on Dec. 9, 2005, and Korea Patent Application No. 10-2006-0039282, filed on May 1, 2006, in the Korean Intellectual Property Office, the disclosures of which are incorporated herein in their entirety by reference.

BACKGROUND OF THE INVENTION

1. Field of the Invention

The present invention relates to a robot for simultaneously generating and expressing emotions, and more particularly, to a robot generating and expressing multiple emotions like a human.

2. Description of Related Art

The fields in which robots can be applied have changed from industries to services in houses or public places. In order to appropriately provide a service to people by using a robot, an intimate communication method between the robot and humans is required.

Research has shown that recognition and expression of emotions of a robot plays an important part in the communication method between the robot and humans. However, it has been ignored in the development of many robots up to now. As a result, robots do not express any emotion, or express very limited emotions.

In a conventional model for the emotions of a robot, only one emotion among predefined emotions, which has the highest level, is expressed. In addition, since only a fixed method is used for generating an emotion of the robot, an appropriate emotion cannot be generated and expressed for various external events. Accordingly, the number of emotions, which a robot can express, is very limited, and the emotional expressions are also very limited.

SUMMARY OF THE INVENTION

The present invention provides a method of generating and expressing multiple emotions of a robot, which are similar to those of a human, in order to allow natural communication between a robot and a human.

According to neuroscience research, a human can have various emotions simultaneously, and different emotion generation mechanisms are used for different emotions. For example, surprise, which is one of a set of primary emotions, is generated by the cerebral limbic system, and a secondary emotion such as sadness, which is acquired by learning, is generated by various parts of the brain such as the prefrontal lobe and somatosensory cortex together with the cerebral limbic system.

A theory in neuroscience states that, by using the proposed method of generating emotions according to an embodiment of the present invention, all primary emotions exceeding threshold values of the primary emotions can be expressed simultaneously. In the method, all the primary emotions are classified into types of primary and secondary emotions, and different emotion generation mechanisms are applied to different types of emotions.

Accordingly, the present invention provides a method of generating and expressing various emotions of a robot, which are similar to those of a human, for external environments or reactions of a human.

According to an aspect of the present invention, there is provided a robot for generating multiple emotions, comprising: a sensor unit sensing external environment information; a database unit storing a predetermined list including information on behaviors of the robot, a user's reaction corresponding to each behavior of the robot, and favorite objects of the robot; a primary emotion generation unit generating an emotion corresponding to characteristics of the sensed information when the sensed information exceeds a predetermined threshold value; and a secondary emotion generation unit generating an emotion corresponding to characteristics of the sensed information based on the information sensed by the sensor unit, the list stored in the database unit, an amount of internal power of the robot, internal information on the robot indicating the existence of an operational error and an elapse of time.

According to another aspect of the present invention, there is provided a method of generating multiple emotions comprising a database unit storing a list including information on behaviors the robot is allowed, a user's reaction corresponding to each behavior of the robot, and favorite objects of the robot, the method comprising: (a) sensing external environment information by using a sensor; (b) generating an emotion corresponding to characteristics of the sensed information when the sensed information exceeds a predetermined threshold value; and (c) generating an emotion corresponding to characteristics of the sensed information based on the information sensed by the sensor unit, the list stored in the database unit, an amount of internal power of the robot, internal information on the robot indicating the existence of an operational error, and an elapse of time.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments of the present invention will now be described in detail with reference to the accompanying drawings. Like reference numerals in the drawings denote like elements.

In the description of the present invention, when a detailed description for known functions or structures is determined to be unnecessary and not to clarify the subject matter of the present invention, the detailed description will be omitted.

Figure 1:
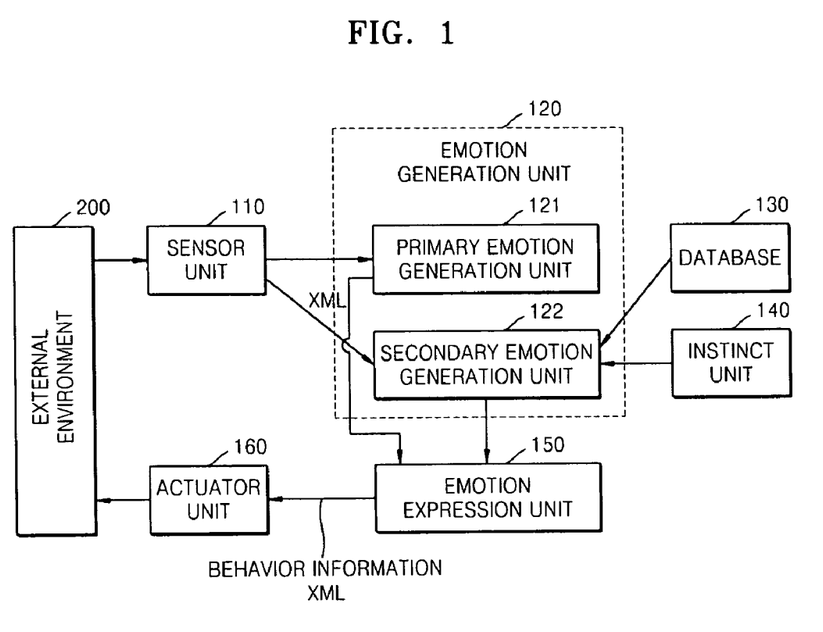
FIG. 1 is a block diagram illustrating an internal structure of a robot that generating multiple emotions according to an embodiment of the present invention.

FIG. 1 is a block diagram illustrating an internal structure of a robot that generates multiple emotions according to an embodiment of the present invention.

The robot can generate and express various emotions similar to those of a human simultaneously. In order to implement the features according to the present embodiment, the robot includes a sensor unit 110, an emotion generation unit 120, a database unit 130, an instinct unit 140, an emotion expression unit 150, and an actuator unit 160.

The sensor unit 110 senses external environment information. The external environment information according to an embodiment of the present invention includes information on a facial expression and gesture of a robot user, information on senses including sight, hearing, touch, smell, and pressure senses, and other information which can be acquired by means of sensors.

For example, the external environment information includes a facial expression, a voice, a gesture, and the like which are related to a feeling state of the user, objects such as a cup, a toy, and an item of food, and physical conditions such as illumination, humidity, and temperature.

For the independence of the sensor unit 110, sensor information is transmitted in extensible markup language (XML) format by means of an interface which is different from a conventional method of transmission of the sensor information.

The emotion generation unit 120 includes a primary emotion generation unit 121 which generates primary emotions and a secondary emotion generation unit 122 which generates secondary emotions. The primary and secondary emotions will be described later with reference to FIG. 2.

The primary emotion generation unit 121 generates an emotion based on characteristics of the sensor when the information sensed by the sensor unit 110 exceeds a predetermined threshold value. When an emotion is generated in the primary emotion generation unit 121, an external evaluation or the like based on a list stored in the database unit 130 is not considered. For example, certain levels of a surprise emotion and a fear emotion are immediately generated based on information received from the sensor unit 110.

When a sudden loud sound is generated in an adjacent area, the sensor unit 110, for example, a microphone, senses the sound and transmits the sensed sound to the emotion generation unit 120. The information received from the microphone is configured in advance to be connected to the surprise emotion, and the level of the surprise emotion is determined based on the magnitude of the sensed loud voice signal.

The surprise emotion may be configured in advance to be generated when a sudden change over a threshold value that is sensed by a sound-sensed sensor, an image signal detection sensor, or a touch sensor occurs.

In this case, the level of the generated surprise emotion is determined by using Equation 1.

$$E_{surprise}(t+1) = E_{surprise}(t) + \sum_{j=1}^{N} w_j \times S_j(t) - \delta(t) \quad \text{[Equation 1]}$$

In Equation 1, the level of a current surprise emotion $E_{surprise}(t+1)$ is determined by a sum of the magnitude of a past surprise $E_{surprise}(t)$ and the multiplication of the magnitude of a signal related to the surprise emotion and a weighting factor $w_j$ (Here, N denotes the number of all the signals related to the surprise emotion.). $\delta(t)$ denotes a damping factor and functions to suppress the surprise emotion as time elapses.

The secondary emotion generation unit 122 generates an emotion corresponding to characteristics of the sensed information based on an external evaluation according to a list which is stored in the database unit 130, internal information on the robot, and a lapse of time together with the sensed information.

An expression of a delight emotion will now be described in detail with reference to Equation 2.

$$E_{delight}(t+1) = \quad \text{[Equation 2]}$$
$$E_{delight}(t) + a_n \times A_n + \sum_{l=1}^{L} c_l \times I_l(t) - \sum_{m=1}^{M} b_m \times H_m(t) - \beta(t)$$

In Equation 2, the level of a current delight emotion $E_{delight}(t+1)$ is represented as a sum of the level of a past delight emotion $E_{delight}(t)$, an external environment evaluation factor $A_n(t)$ generated based on whether the sensed information is listed in the list of the database unit 130, an instinct emotion $I_l(t)$ generated based on the internal information of the robot, and other emotion elements $H_m(t)$ which are related to each other.

Here, N, L, and M denote the number of evaluation elements which are generated based on whether the sensed information is listed in the list of the database unit 130, the number of pieces of related internal information on the robot, and the number of other emotions related to each other, respectively. $\beta(t)$ denotes a damping factor which functions to suppress the delight emotion as time elapses.

A coefficient $A_n(t)$ is influenced by the type of object recognized externally by the sensor unit 110, the type of behavior of the robot, and whether a state of a user's emotional reaction is listed in the list of the database unit 130.

The secondary emotion generation unit 122 strengthens a positive emotion when the sensed information is listed in the list of the database unit 130. On the other hand, the secondary emotion generation unit 122 strengthens a negative emotion when the sensed information is not listed in the list of the database unit 130. The strengthening of the positive or negative emotion is actually related to one or more secondary emotions and reflected in the generation of the secondary emotions.

For example, when the positive emotion is strengthened due to a behavior being in a moral-norm list or an object which is in a favorite object list among lists of the database unit 130, the magnitude of the delight emotion among the secondary emotions increases. The secondary emotions will be described with reference to FIG. 2. On the other hand, when the negative emotion is strengthened due to the object not being listed in a list of the database unit 130, the magnitude of the sadness emotion among the secondary emotions increases.

How the database unit 130 influences the generation of an emotion will be described in detail with reference to FIGS. 3 and 4.

The coefficient $A_n(t)$ is influenced by a time and a mood. The coefficient $A_n(t)$ will be described in detail with reference to FIGS. 5 and 6.

The instinct emotion $I_1(t)$ of the robot is generated by the instinct unit 140 based on the internal information of the robot and is reflected in the generation of an emotion in the secondary emotion generation unit 122. The internal information of the robot indicates the amount of internal power of the robot, a status of an operation, for example, failure, and the like.

For example, the instinct unit 140 generates a fatigue emotion which is configured in advance to correspond to the amount of power supplied when the amount of internal power of the robot decreases below a predetermined level.

In addition, other emotion elements $H_m(t)$, which the robot recognizes, are reflected in the generation of the secondary emotions. For example, when the magnitude of the delight emotion E(t) is calculated, magnitudes of emotions such as anger, sadness, and denial are considered. Likewise, when the magnitude of an anger emotion is calculated, the delight emotion is considered. The secondary emotion generation unit 122 reflects emotions which conflict with each other based on emotion types using the coefficient of the $H_m(t)$.

The emotion generation unit 120 detects all the emotion levels generated by the primary and secondary emotion generation units 121 and 122 and the instinct unit 140 at regular intervals and transmits all the emotions which exceed predetermined threshold values.

The database unit 130 stores, in advance, lists including information on types of behavior the robot is allowed, an external reaction corresponding to each type of behavior of the robot, and favorite objects of the robot.

The database unit 130 becomes a reference for strengthening a negative emotion when the emotion generation unit 120 of the robot generates an emotion in a response to a behavior, an object, or a user's reaction which is not listed in the lists that are stored in advance. In addition, the database unit 130 becomes a reference for strengthening a positive emotion when the emotion generation unit 120 of the robot generates an emotion in response to a behavior, an object, or a user's reaction which is in the lists that are stored in advance. The strengthening of the positive or negative emotion is actually related to one or more secondary emotions that are to be reflected in the generation of the secondary emotion.

As an example of the behavior list stored in the database unit 130 which lists types of behaviors the robot is allowed, a moral-norm list stores behavior determined to be allowed to the robot according to moral norms and becomes a reference for determining whether a behavior of the robot has a problem based on the moral norms.

When the robot performs in a behavior that causes damage to an object, it is determined that the behavior does not exist in the moral-norm list. As a result, the behavior of the robot has a negative effect on the emotion.

As another example, a favorite object list provides a reference for determining whether a currently recognized object is a favorite object of the robot or not. For example, when the user gives an object to the robot, the robot determines whether the currently recognized object is in the favorite object list so as to provide a reference for generating an emotion of the robot.

As another example, a user's reaction list is configured to generate a positive or a negative emotion to the robot when a user's reaction acquired by means of the sensor unit 110 is delight or sadness, respectively.

Figure 2:
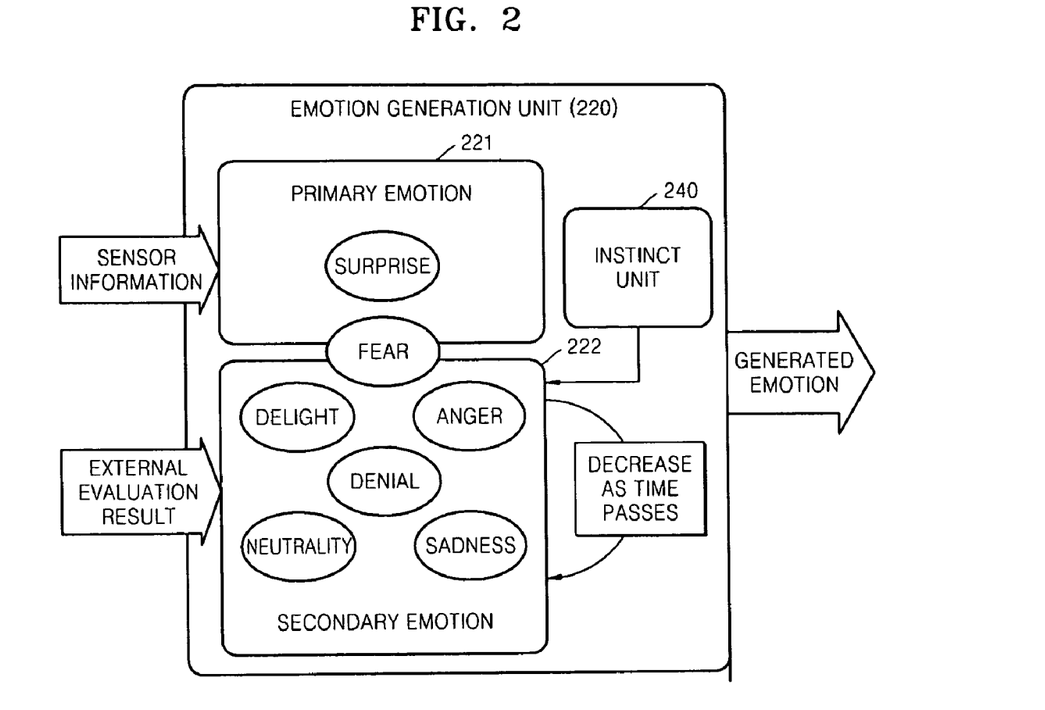
FIG. 2 is a block diagram illustrating emotions generated by a robot for generates multiple emotions according to an embodiment of the present invention.

FIG. 2 is a block diagram illustrating emotions generated by a robot that generates multiple emotions according to an embodiment of the present invention.

The emotions generated by the robot can be classified into a primary emotion 221 and a secondary emotion 222. Generation mechanisms of the primary and secondary emotions 221 and 222 are different from each other.

In a human, surprise, which is one of primary emotions, is generated by the cerebral limbic system according to neuroscience research. On the other hand, secondary emotions such as sadness acquired by learning are generated by other various parts such as a prefrontal lobe and a somatosensory cortex together with the cerebral limbic system.

Similar to a human, the robot for generating multiple emotions according to an embodiment of the present invention generates primary emotions 221 based on sensor information received from the sensor unit 110 without any external evaluation. A surprise emotion and some of a fear emotion belong to the primary emotions.

Secondary emotions 222 are generated after an evaluation according to reference to the list of the database unit 130, an emotion generated by the instinct unit 140, and effects of time and the like are evaluated as a whole. A delight emotion, an anger emotion, a denial emotion, a neutrality emotion, a sadness emotion, and some of a fear emotion belong to the secondary emotions 222.

Figure 3:
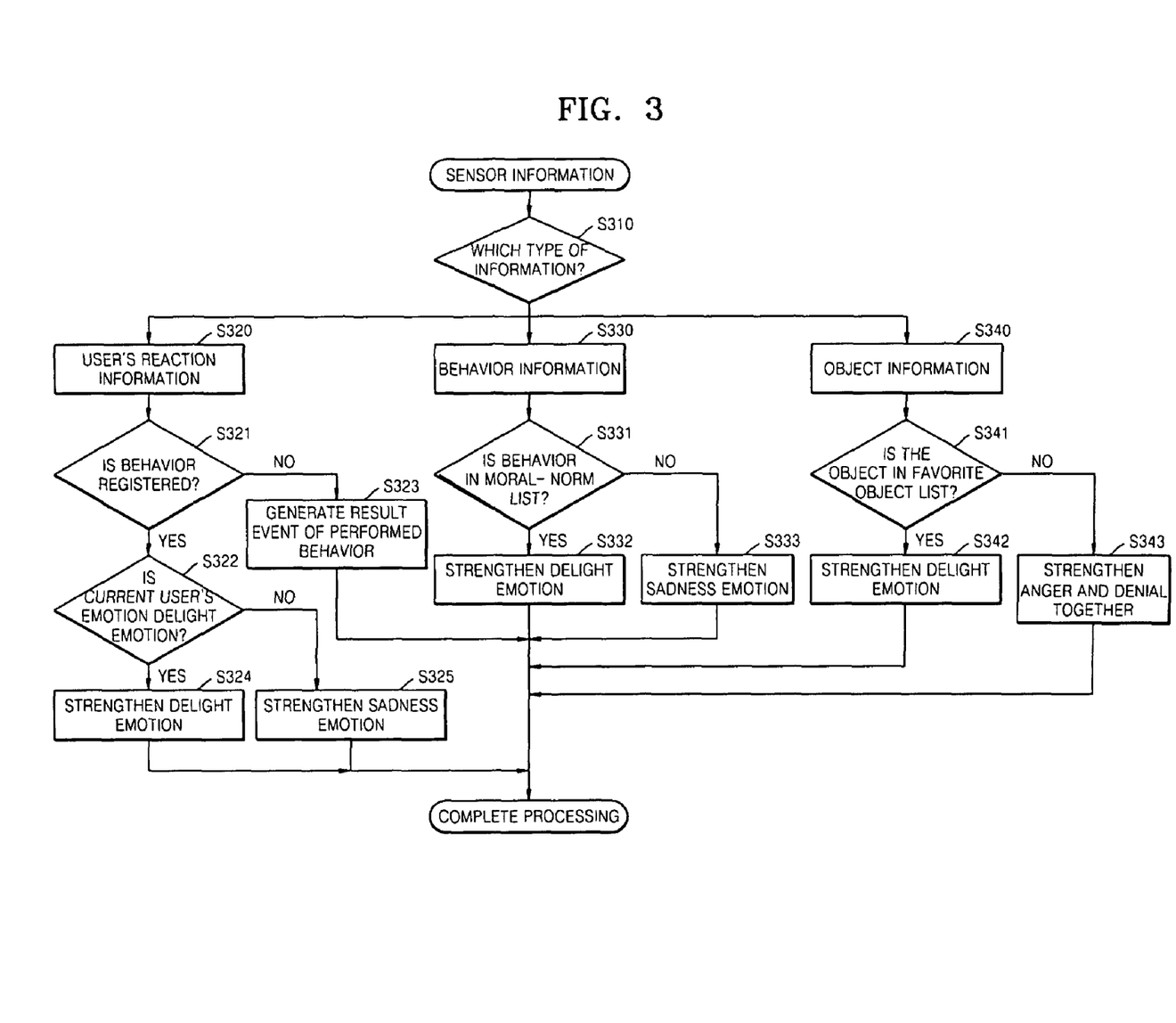
FIG. 3 is a flowchart illustrating the evaluation of external environment information of a sensor unit of the robot that generates multiple emotions in order to generate an emotion according to an embodiment of the present invention.

FIG. 3 is a flowchart illustrating the evaluation of external environment information of a sensor unit of the robot that generates multiple emotions in order to generate an emotion according to an embodiment of the present invention.

After the emotion generation unit 120 receives sensor information in an XML format from the sensor unit 110, the emotion generation unit 120 determines the type of sensor information (Operation S310). Then, it is determined whether the sensor information is listed in the lists stored in the database unit 130 in advance (Operations S321, S331, and S341). A positive emotion is strengthened (Operations S324, S332, and S342) when the sensor information is user's reaction data, behavior data, or object data which is listed in the database unit 130. On the other hand, when the sensor information is data which is not in the lists of the database unit 130, a negative emotion is strengthened (Operations S325, S333, and S343).

For the user's reaction information, it is determined whether a behavior in which the robot performed is stored in the database unit 130 (Operation S321). When the behavior is not stored in the database unit 130, the behavior in which the robot performed and the user's reaction for the behavior are newly stored in the database unit 130 (Operation S323). When the user's reaction for the behavior of the robot exists in the database unit 130, it is determined whether the user's reaction is positive or negative, and the determination is reflected in the generation of an emotion.

The delight emotion, sadness emotion, anger emotion, denial emotion, and the like are exemplary emotions according to an embodiment of the present invention, and therefore are not limited thereto.

Figure 4:
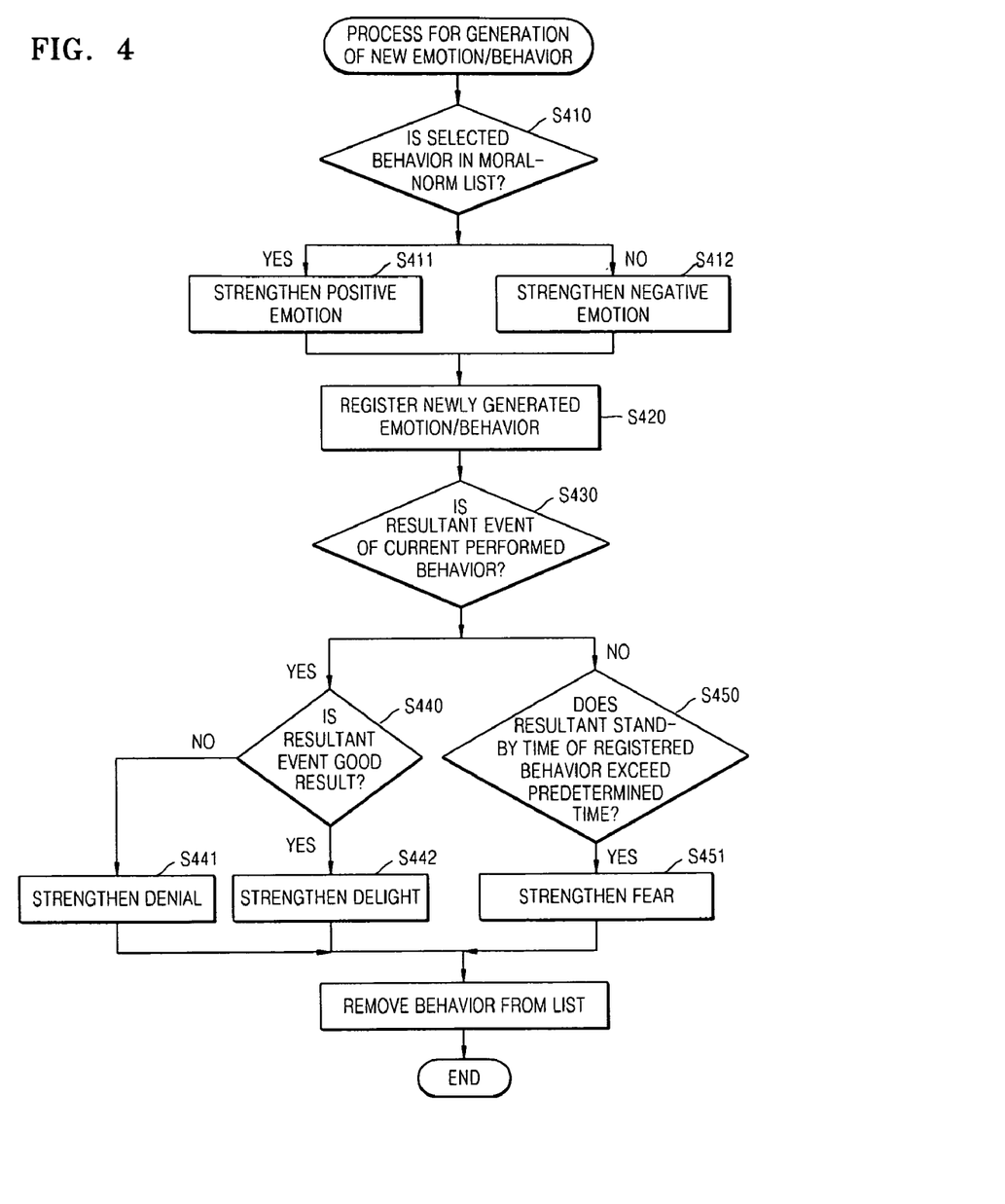
FIG. 4 is a flowchart illustrating the generation of an emotion in a robot according to an embodiment of the present invention by evaluating an external reaction to the robot's behavior.

FIG. 4 is a flowchart illustrating the generation of an emotion in a robot according to an embodiment of the present invention by evaluating an external reaction to the robot's behavior.

It is checked whether the newly generated behavior of the robot is in a list, for example, a moral-norm list, which is stored in the database unit 130 (Operation S410). When the behavior is in the list, a positive emotion is strengthened (Operation S411). On the other hand, when the behavior is not in the list, a negative emotion is strengthened (Operation S412).

The robot's emotion which has been newly generated by strengthening the positive or negative emotion is temporarily stored in a robot performance list (Operation S420). When there is a user reaction to the robot's newly generated emotion (Operation S430), it is determined whether the user's reaction is in the user's reaction list which is stored in the database unit 130, and an emotion such as a denial emotion or a delight emotion is strengthened based on whether the user's reaction is a good reaction (Operations S440, S441, and S442).

When there is no user's reaction to the newly generated emotion after a predetermined time elapses, an emotion such as a fear emotion is strengthened (Operation S451). FIG. 4 is an example of the generation of a secondary emotion, and therefore various changes or substitutions in form and details may be made therein without departing from the spirit and scope of the present invention.

Figure 5:
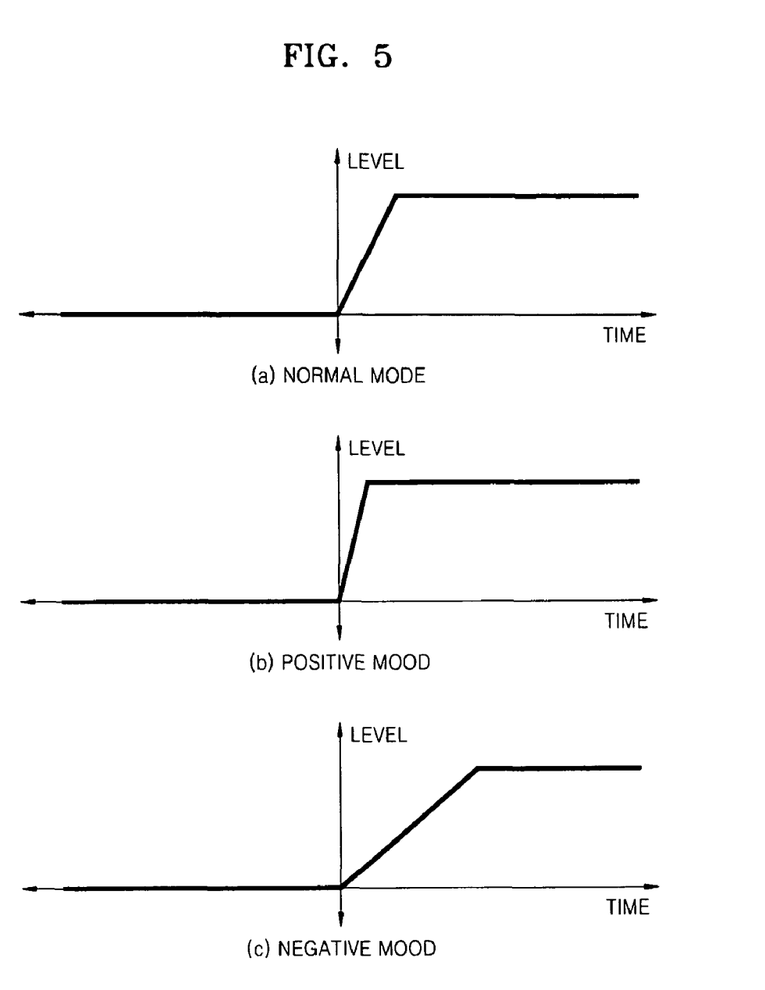
FIG. 5 illustrates graphs representing effects of a positive mood, a negative mood, and how an elapse of time effects the generation of emotion in a robot for generating multiple emotions according to an embodiment of the present invention.

FIG. 5 illustrates graphs representing effects of a positive mood, a negative mood, and how an elapse of time affects the generation of emotion in a robot for generating multiple emotions according to an embodiment of the present invention.

The mood M(t) indicates a sum Ek(t) of levels of secondary emotions illustrated in FIG. 2. When the mood M(t) is greater than zero, the mood becomes a positive mood. On the other hand, when the mood M(t) is smaller than zero, the mood becomes a negative mood. The Ek representing a weighting factor in Equation 3 has a value of +1 or −1 based on whether a corresponding emotion element is positive or negative.

$$M(t) = \sum_{k=1}^{A} e_k \times E_k(t)$$ [Equation 3]

Figure 6:
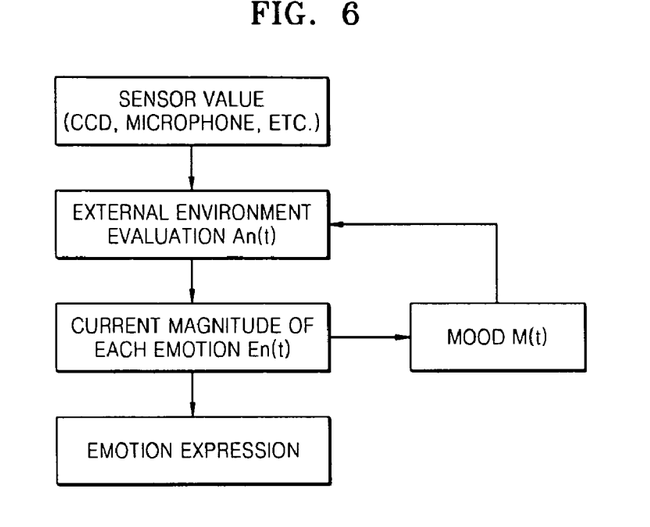
FIG. 6 is a block diagram illustrating a relationship between a mood and an external environment evaluation according to an embodiment of the present invention.

FIG. 6 is a block diagram illustrating a relationship between the mood M(t) and an external environment evaluation An(t) according to an embodiment of the present invention.

The external environment evaluation An(t) which is generated based on the information sensed by the sensor unit 110 and on lists which are stored in the database unit 130 have an effect on the current magnitude of each emotion Ek(t). Also, the current magnitude of each emotion Ek(t) has an effect on the mood M(t), and again, the external environment evaluation An(t) has an effect on the current magnitude of each emotion Ek(t).

For example, in the positive mood in which the mood of the robot M(t) is greater than zero, when the robot recognizes a favorite object, the magnitude of An(t) increases as illustrated in FIG. 5(B). On the other hand, when the robot recognizes a distasteful object, the magnitude of the An(t) increases as illustrated in FIG. 5(C) when in the positive mood.

In the negative mood in which the mood of the robot M(t) is smaller than zero, when the robot recognizes a favorite object the An(t) increases in size as illustrated in FIG. 5(C). On the other hand, when the robot recognizes a distasteful object the An(t) increases in size as illustrated in FIG. 5(B) when in the negative mood.

As a result, when the current mood of the robot M(t) is the positive mood, a positive object has a greater effect on the emotion than a negative object. On the other hand, when the current mood of the robot M(t) is the negative mood, a negative object has a greater effect on the emotion than a positive object.

FIG. 6 is a block diagram illustrating the effects of the mood of the robot on the generation of an emotion. The effects of the mood on the generation of an emotion are described with reference to FIG. 5, and so, a detailed description of the effects is omitted here.

Figure 7:
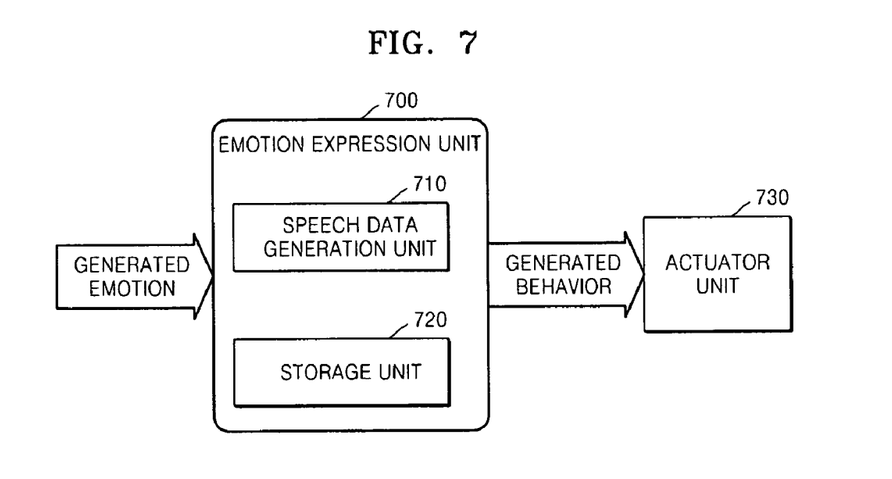
FIG. 7 is a block diagram illustrating an emotion expression unit which expresses an emotion generated by an emotion generation unit according to an embodiment of the present invention.

FIG. 7 is a block diagram illustrating an emotion expression unit, which expresses an emotion generated by the emotion generation unit, according to an embodiment of the present invention.

The emotion expression unit 700 includes a speech data generation unit 710 and a storage unit 720. The emotion expression unit 700 expresses emotions based on the multiple emotions generated by the emotion generation unit 120 and transmits the emotions as data in XML format to an actuator unit 730 in order to generate behavior based on the emotions of the robot.

The speech data generation unit 710 generates an appropriate conversation pattern corresponding to the emotions of the robot and transmits the conversation pattern to the actuator unit 730. The speech data generation unit 710 stores a vast amount of conversation patterns. Generally, the speech data generation unit 710 is configured as an external unit and required conversation information is acquired by transmission between the robot and the speech data generation unit 710.

The storage unit 720 stores behavior related to each emotion. For example, the storage unit 720 stores a method of representing an LCD or LED which can express a delight emotion and information on a motor which drives the robot. In addition, the storage unit 720 determines whether there is a collision among various types of behavior which are related to multiple emotions. When a collision is expected, the various types of behavior are synthesized as one behavior or the behavior having the highest level of emotion among the various types of behavior that collide is selected. When there is no collision, the storage unit 720 transmits the behaviors to the actuator unit 730.

For example, when two types of behavior which are different with each other compete to simultaneously control a wheel of the robot, an emotion expression module synthesizes the two types of behavior as one behavior or selects the behavior having the higher level of emotion between the two types of behavior and transmits the selected behavior to the actuator unit 730.

The actuator unit 730 performs in the behavior which is finally selected based on data received from the emotion expression unit 700 by means of the LED, LCD, a driving motor of the robot, or the like in a way having a physical effect on the external environment. For example, the behavior may be to drive the motor of the robot, to turn the LED on/off, or to express a face of the robot on the LCD.

Figure 8:
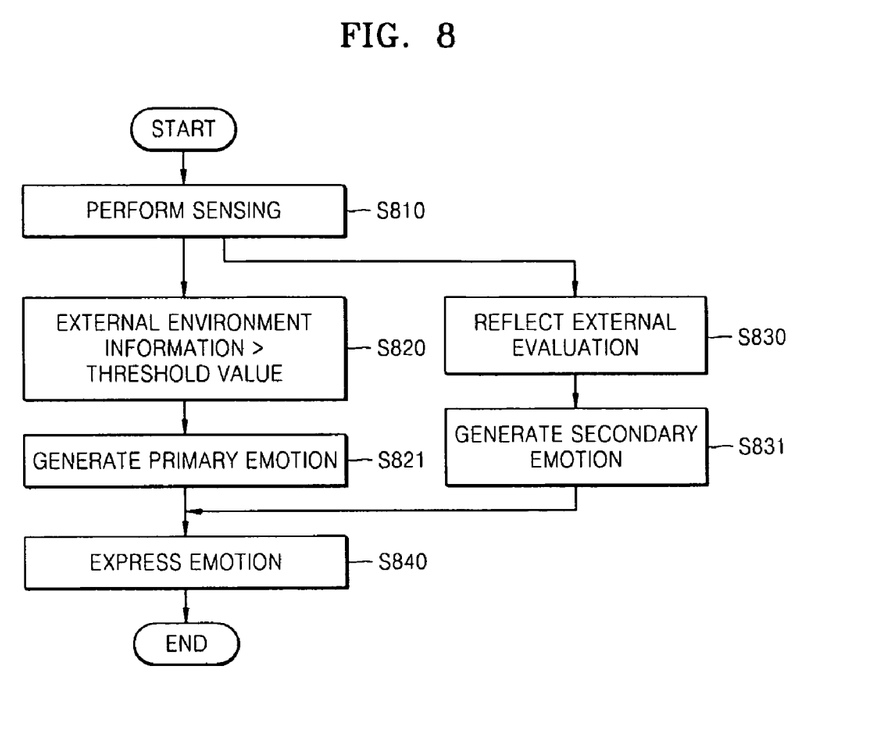
FIG. 8 is a flowchart illustrating a method of generating multiple emotions of a robot according to an embodiment of the present invention.

FIG. 8 is a flowchart illustrating a method of generating multiple emotions of a robot according to an embodiment of the present invention.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

A robot for generating multiple emotions and a method of generating multiple emotions in a robot enables a robot to generate and express emotions similar to those of a human.

As a result, a more natural interaction between a user and the robot can be achieved, and accordingly an aspect of the present invention can be applied to a service robot such as an educational robot or an entertaining robot.

The present invention has been particularly shown and described with reference to exemplary embodiments thereof. While specific terms are used, the terms should be considered in descriptive sense only and not for purposes of limitation of the meanings of the terms or the scope of the invention. Therefore, it will be understood by those skilled in the art that various changes in form and details may be made therein without departing from the spirit and scope of the invention as defined by the appended claims.

What is claimed is:

1. A robot for generating multiple emotions, comprising:
a sensor unit sensing external environment information;
a database unit storing a predetermined list including information on allowed behaviors of the robot, a user's reaction corresponding to each behavior of the robot, and favorite objects of the robot;
a primary emotion generation unit generating a predetermined primary emotion corresponding to characteristics of the sensed information after receiving input from an external environment and when the sensed information exceeds a predetermined threshold value; and
a secondary emotion generation unit generating a secondary emotion corresponding to characteristics of the sensed information after receiving input from an external environment;
wherein the characteristics used for generating the primary emotion is mutually exclusive of the characteristics used for generating the secondary emotion,
wherein the input received from the external environment is based on at least one of the information sensed by the sensor unit, the list stored in the database unit, an amount of internal power of the robot, internal information on the robot indicating the existence of an operational error of the robot or any combination thereof,
wherein each of the at least one of the received input from the external environment and the user's reaction or any combination thereof is configured to generate the secondary emotions,
wherein the generated secondary emotions is individually adjusted from each of the received external input, and
wherein the generated secondary emotion is further adjusted from the user's reaction or the user's non-reaction after a predetermined elapse of time.

2. The robot of claim 1, further comprising an instinct unit generating a predetermined emotion corresponding to the internal information on the robot.

3. The robot of claim 2, further comprising an emotion expression unit externally expressing emotions generated by the primary and secondary emotion generation units and the instinct unit.

4. The robot of claim 1,
wherein the secondary emotion generation unit strengthens a positive emotion when the sensed information is listed in the list stored in the database unit, and
wherein the secondary emotion generation unit strengthens a negative emotion when the sensed information is not listed in the list.

5. The robot of claim 1, wherein the external environment information sensed by the sensor unit comprises information on a facial expression and gesture of a robot user and sensed information including sight, hearing, touch, smell, and pressure senses.

6. The robot of claims 1, wherein information sensed by the sensor unit is transmitted to the primary and secondary emotion generation units in XML (extensible markup language) format.

7. A method of generating multiple emotions comprising a database unit storing a list including information on behaviors the robot is allowed, a user's reaction corresponding to each behavior of the robot, and favorite objects of the robot, the method comprising:
(a) sensing external environment information by using a sensor,
(b) generating a predetermined primary emotion corresponding to characteristics of the sensed information when the sensed information after receiving input from an external environment exceeds a predetermined threshold value; and
(c) generating a secondary emotion corresponding to characteristics of the sensed information after receiving input from an external environment;
wherein the characteristics used for generating the primary emotion is mutually exclusive of the characteristics used for generating the secondary emotion,
wherein the input received from the external environment is based on at least one of the information sensed by the sensor unit, the list stored in the database unit, an amount of internal power of the robot, internal information on the robot indicating the existence of an operational error of the robot or any combination thereof,
wherein each of the at least one of the received input from the external environment and the user's reaction or any combination thereof is configured to generate the emotion,
wherein the generated emotion is individually adjusted from each of the received external input, and
wherein the generated secondary emotion is further adjusted from the user's reaction or the user's non-reaction after a predetermined elapse of time.

8. The method of claim 7, further comprising:
(d) generating a predetermined emotion corresponding to the internal information on the robot.

9. The method of claim 8, further comprising externally expressing emotions generated by (b) and (c).

10. The method of claim 7, wherein (c) comprises strengthening a positive emotion when the sensed information is listed in the list stored in the database unit and strengthening a negative emotion when the sensed information is not listed in the list.

11. The method of claim 7, wherein the sensor senses information comprising information on a facial expression and gesture of a robot user and sensed information including sight, hearing, touch, smell, and pressure senses.

12. The method of claim 7, wherein the external environment information sensed by the sensor is transmitted in XML (extensible markup language) format.

* * * * *